United States Patent [19]
Bauer et al.

[11] Patent Number: 5,407,224
[45] Date of Patent: Apr. 18, 1995

[54] PASSENGER-SIDE AIRBAG COVER TO CANISTER ATTACHMENT

[75] Inventors: John G. Bauer, Troy; David M. Jackson, Rochester Hills, both of Mich.

[73] Assignee: Morton International, Inc., Chicago, Ill.

[21] Appl. No.: 228,600

[22] Filed: Apr. 15, 1994

[51] Int. Cl.6 .............................................. B60R 21/16
[52] U.S. Cl. ................................................ 280/728 A
[58] Field of Search ........... 280/728 R, 728 A, 728 B, 280/732

[56] References Cited

U.S. PATENT DOCUMENTS 5,190,314  3/1993  Takasugi .......................... 280/732

FOREIGN PATENT DOCUMENTS 4-303050  10/1992  Japan ............................. 280/728 A
4-303051  10/1992  Japan ............................. 280/728 A
5-229392   9/1993  Japan ............................. 280/732

Primary Examiner—Margaret A. Focarino
Assistant Examiner—Paul N. Dickson
Attorney, Agent, or Firm—George W. Rauchfuss, Jr.; Gerald K. White

[57] ABSTRACT

The reaction canister of a passenger-side airbag module is locked into position behind the instrument panel in such a manner as to permit freedom of movement of a retaining member along three axes while retaining structural integrity. This results from an arm depending from the reaction canister passing through an enlarged opening in the retaining member extending from the panel, or a portion thereof. The arm carries a rod which limits relative vertical movement of the retaining member between the canister and rod.

20 Claims, 1 Drawing Sheet

PASSENGER-SIDE AIRBAG COVER TO CANISTER ATTACHMENT

TECHNICAL FIELD

This invention relates to the field of automotive airbags. More particularly, it relates to the attachment of the instrument panel breakaway cover to the reaction canister of the airbag module.

BACKGROUND ART

Passenger-side airbag modules are normally positioned behind the instrument panel in front of the location usually occupied by a passenger. The airbag module includes a trough-shaped reaction canister which contains the folded airbag and a gas generant for inflating the airbag when triggered by a collision sensor. The vehicle's instrument panel often includes a breakaway portion which is detached from the main panel by the expanding airbag to form a door through which the airbag inflates. In an alternative construction, the cover which forms the door may be separate from the instrument panel. However, it is normally flush with the panel for aesthetic reasons.

A common problem with the passenger-side airbag covers arises from poor fit and finish to the vehicle's instrument panel. Furthermore, it is often difficult to assemble an airbag module to an instrument panel because of the close tolerances and lack of space. A common method of assembling the cover to the airbag module is by means of small fasteners such as rivets. However, they pose the risk of coming loose and being trapped in the airbag where they may become projectiles during airbag deployment.

Accordingly, it is a primary object of the present invention to provide improved apparatus for interconnecting the airbag module reaction canister with the airbag cover portion of the instrument panel. Another object is to provide such an apparatus which provides three degrees of freedom of movement between the reaction canister and the breakaway portion of the instrument panel during assembly while retaining adequate structural integrity. Other objects, features, and advantages will become apparent from the following description and appended claims.

DISCLOSE OF INVENTION

The cover portion of an instrument panel includes a locking projection which defines an opening therethrough. An arm on the reaction canister extends through the opening with clearance for movement along mutually perpendicular horizontal axes. A rod carried by the arm locks the projection while permitting movement along a third axis.

BEST MODE FOR CARRYING OUT THE INVENTION

Figure 1:
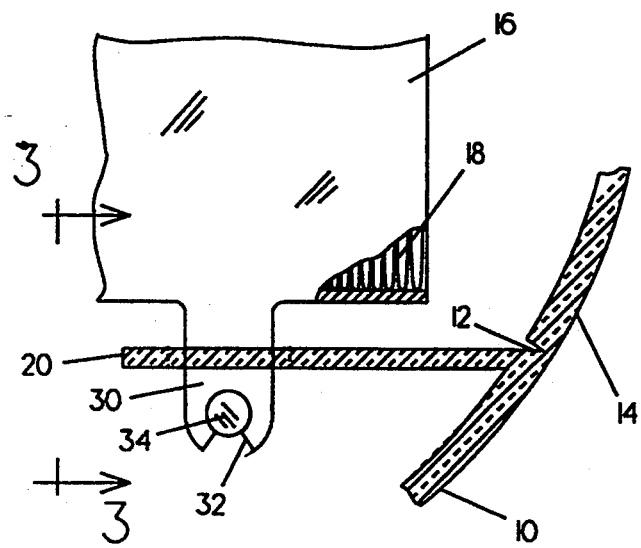
FIG. 1 is a cross-section taken through an instrument panel, illustrating its attachment to a reaction canister shown in partial view.
Figure 2:
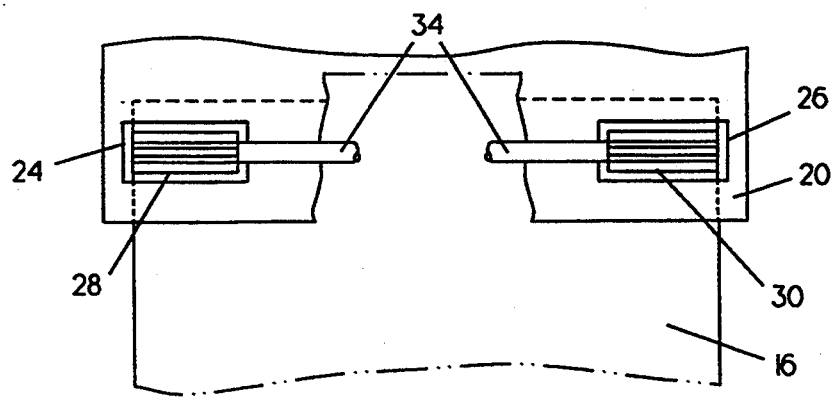
FIG. 2 is a bottom view showing the relationship of the reaction canister to a portion of the instrument panel, the central portion thereof being omitted for ease of illustration.

With particular reference to FIG. 1, there is illustrated an instrument panel 10 having a weakened portion defining a tear line 12 forming a breakaway cover 14 portion of the instrument panel. Mounted closely behind the cover 14 is a reaction canister 16 containing a folded airbag 18. Behind the instrument panel 10 is a locking projection in the form of a horizontal shelf 20 extending forwardly (relative to the vehicle). The shelf 20 is substantially rectangular and extends beyond the side edges of the reaction canister 16 as shown in FIG. 2. The shelf 20 defines a pair of rectangular openings 24, 26 aligned with the side edges of the reaction canister 16.

Extending downwardly from either side of the reaction canister 16 are a pair of arms 28, 30. The arms are of rectangular cross-section, smaller than the openings 24, 26 and extend therethrough as shown in FIG. 1. The lower end of each of the arms 28, 30 is bifurcated to form a circular opening with a V-shaped entrance 32. Each end of a circular rod 34 is snapped into a different one of the bifurcated arms 28, 30 after the reaction canister 16 has been lowered into position with its arms extending through the respective openings 24, 26. Alternatively, if space permits, the rod may be inserted through the circular openings in the arms.

Figure 3:
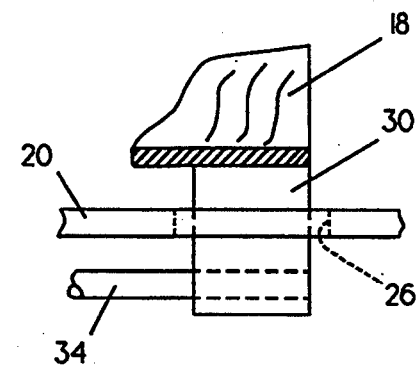
FIG. 3 is a cross-section taken substantially along the line 3—3 of FIG. 1.

As will be apparent from the drawings, locking projections the is movable relative to the reaction canister thereof in three degrees of freedom. Vertical movement of the locking projection is permitted between the limits imposed by the bottom of the reaction canister and the rod 34 as illustrated in FIGS. 1 and 3. Horizontal motion from side to side and forward to back is permitted by the fact that the openings 24, 26 in the shelf 20 are larger in both dimensions than the cross-sections of the arms 28, 30, as will be apparent from FIG. 2.

It will now be apparent that this invention results in much simpler installation by greatly increasing tolerance limits and by reducing the number of parts required. A number of possible variations of this invention will also be apparent. For example, there could be more than two arms supporting one or more rods. Alternatively, a single arm could depend from the reaction canister and support an extending rod at its midpoint for locking the arm within a single opening. Furthermore, the openings in the locking projection need not be fully bounded, only enough so as to retain the arm therein.

It is believed that the many advantages of this invention will now be apparent to those skilled in the art. It will also be apparent that a number of modifications may be made therein without departing from its spirit and scope. Accordingly, the foregoing description is to be construed as illustrative only, rather than limiting. This invention is limited only by the scope of the following claims.

We claim:

1. In a passenger-side airbag module for a motor vehicle including a reaction canister enclosing an airbag, a cover forming a breakaway portion of the motor vehicle instrument panel and detachable from said instrument panel under the influence of the expanding airbag, and means for interconnecting said cover and said canister, the improvement wherein said interconnecting means comprises:

an arm extending outwardly from said reaction canister;

a rod carried by said arm and spaced from said canister; and a locking projection extending from said instrument panel, said locking projection defining an opening therein intermediate said canister and rod and enclosing said arm;

whereby said projection is constrained between said canister and rod and is freely movable relative to said canister and rod.

2. The improvement of claim 1 wherein said rod is detachable from said arm.

3. The improvement of claim 2 wherein said arm includes a bifurcated portion retaining said rod.

4. The improvement of claim 3 wherein said rod makes a snap-fit engagement with said bifurcated portion.

5. The improvement of claim 1 wherein said interconnecting means comprises:

at least two arms extending outwardly from the reaction canister and wherein said rod is supported therebetween.

6. The improvement of claim 5 comprising:

a different opening enclosing each of said arms.

7. The improvement of claim 4 wherein said interconnecting means comprises:

at least two arms extending outwardly from the reaction canister and wherein said rod is supported therebetween.

8. The improvement of claim 7 comprising:

a different opening enclosing each of said arms.

9. Apparatus for interconnecting a reaction canister of a motor vehicle passenger-side airbag module with a portion of an instrument panel incorporating a breakaway cover therein which comprises:

a reaction canister;

first and second spaced-apart arms extending from said reaction canister;

a rod attachably supported between said first and second arms in a plane spaced from said reaction canister;

a locking member projection on said instrument panel extending between said rod and reaction canister and relatively movable between said reaction canister and said rod; and means for permitting limited relative motion between said arms and said locking member projection in a plane substantially parallel to that of said rod.

10. The apparatus of claim 9 wherein said means for permitting limited relative motion comprises an opening formed in said locking member projection enclosing at least one of said arms.

11. The apparatus of claim 10 wherein said means for permitting limited relative motion comprises first and second openings enclosing, respectively, said first and second arms, each of said openings having dimensions greater than the cross-sectional dimensions of each of said arms.

12. The apparatus of claim 11 wherein said rod is detachable from said first and second arms.

13. The apparatus of claim 12 wherein each of said first and second arms includes a bifurcated portion retaining said rod.

14. The apparatus of claim 13 wherein said rod makes snap-fit engagements with said bifurcated portions.

15. In a passenger-side airbag module for a motor vehicle including a reaction canister enclosing an airbag, a cover forming a breakaway portion of the motor vehicle instrument panel and detachable from said instrument panel under the influence of the expanding airbag, and means for interconnecting said cover and said canister, the improvement wherein said interconnecting means comprises:

at least two generally rectangular arms extending outwardly from opposite sides of said reaction canister;

a locking projection extending from said instrument panel, said locking projection defining at least two rectangular openings therethrough, each of said rectangular openings enclosing one of said at least two arms with clearance for movement of said locking projection along mutually perpendicular horizontal axes; and a rod attachably supported between two of said arms in a plane spaced from said reaction canister for permitting limited relative movement of said locking projection along said arms between the reaction canister and said rod.

16. The improvement of claim 15 wherein a distal end of each of said arms is bifurcated to form a circular opening with a V-shaped notch to attachably support said rod between said two arms.

17. The improvement of claim 16 wherein said rod is detachable from said arms.

18. The improvement of claim 15 wherein said locking projection is substantially rectangular.

19. The improvement of claim 16 wherein said locking projection is substantially rectangular.

20. The improvement of claim 17 wherein said locking projection is substantially rectangular.

* * * * *

UNITED STATES PATENT AND TRADEMARK OFFICE
CERTIFICATE OF CORRECTION

PATENT NO. : 5,407,224
DATED : April 18, 1995
INVENTOR(S) : John G. Bauer et al.

It is certified that error appears in the above-indentified patent and that said Letters Patent is hereby corrected as shown below:

Column 1, line 49, "DISCLOSE OF INVENTION" should be
--DISCLOSURE OF INVENTION--.

Column 2, lines 29 and 30, "locking projections the is movable"
should be --the locking projection is movable--.

Signed and Sealed this

Fifth Day of November, 1996

Attest:

BRUCE LEHMAN

*Attesting Officer*     *Commissioner of Patents and Trademarks*